(12) United States Patent
Iwabata et al.

(10) Patent No.: US 9,999,327 B2
(45) Date of Patent: Jun. 19, 2018

(54) TOILET APPARATUS

(71) Applicant: TOTO LTD., Kitakyushu-shi, Fukuoka (JP)

(72) Inventors: Tomohiro Iwabata, Kitakyushu (JP); Hiroshi Hashimoto, Kitakyushu (JP)

(73) Assignee: Toto Ltd., Fukuoka (JP)

(*) Notice: Subject to any disclaimer, the term of this patent is extended or adjusted under 35 U.S.C. 154(b) by 0 days. days.

(21) Appl. No.: 15/709,800

(22) Filed: Sep. 20, 2017

(65) Prior Publication Data

US 2018/0084960 A1   Mar. 29, 2018

(30) Foreign Application Priority Data

Sep. 27, 2016   (JP) .................. 2016-188653

(51) Int. Cl.
*A47K 13/24* (2006.01)
*A47K 13/12* (2006.01)
*G01L 1/22* (2006.01)

(52) U.S. Cl.
CPC .............. *A47K 13/24* (2013.01); *A47K 13/12* (2013.01); *G01L 1/2262* (2013.01)

(58) Field of Classification Search
CPC ....... A47K 13/24; A47K 13/12; G01L 1/2262
USPC ............................................ 4/236, 237, 240
See application file for complete search history.

(56) References Cited

U.S. PATENT DOCUMENTS

| | | | |
|---|---|---|---|
| 2016/0374619 A1* | 12/2016 | Borkholder | A47K 13/24 600/301 |
| 2017/0370082 A1* | 12/2017 | Hall | A47K 13/12 |

* cited by examiner

*Primary Examiner* — Tuan N Nguyen
(74) *Attorney, Agent, or Firm* — Carrier Blackman & Associates, P.C.; Joseph P. Carrier; William D. Blackman

(57) ABSTRACT

According to one embodiment, a seating detection sensor includes a strain generating body and a strain gauge. The strain generating body is held on a casing or a toilet seat. The strain generating body receives a load from the toilet seat via a shaft portion to generate a strain. The strain gauge is provided on the strain generating body and detects a strain amount of the strain generating body. A force release portion releases a force applied to an opening in a horizontal direction from the shaft portion in a state of the shaft portion abutting the opening so that the force is not converted downwardly in a vertical direction.

6 Claims, 11 Drawing Sheets

TOILET APPARATUS

CROSS-REFERENCE TO RELATED APPLICATIONS

This application is based upon and claims the benefit of priority from Japanese Patent Application No. 2016-188653, filed on Sep. 27, 2016; the entire contents of which are incorporated herein by reference.

FIELD

Embodiments described herein relate generally to a toilet apparatus.

BACKGROUND

At the present time, a toilet apparatus including seating detection function using a micro switch is released. In the configuration based on the micro switch like this, a user feels strange by sinking the toilet seat when seated, and it sounds like a clicking sound with a small volume, and then quality of level is left to be improved.

Here, it is conceived that seating detection is performed by using a strain gauge. For example, JP H06-88371 A (Kokai) discloses the configuration where the strain gauge is attached to a back surface of the toilet seat, a hinge portion or the like. JP 2000-254040 A (Kokai) discloses the configuration where a load detection means formed of a strain gauge is provided in the toilet seat.

DETAILED DESCRIPTION

Figure 1B:
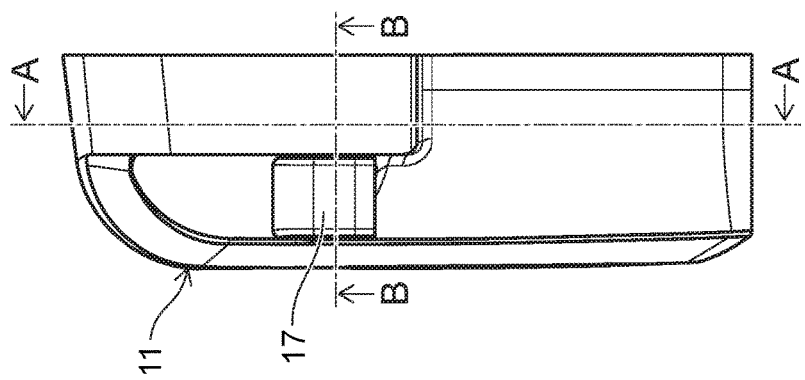
FIG. 1B is an enlarged view of a state in which a toilet seat is removed in portion A of FIG. 1A.

The load applied to the toilet seat on user seating is easily smaller than a back surface of the toilet seat in a hinge portion. If seating is intended to detect by providing a strain gauge on the hinge portion, when the same strain gauge and strain generating body are used, the strain generating body is hard to deflect compared with the case of providing the strain gauge on the back surface of the toilet seat, and then the output of the strain gauge provided on the strain generating body becomes small.

That is, since the output of the strain gauge provided on the hinge portion is small, the load due to movement of the toilet seat in a front-back direction accompanied with weight shift of the user influences largely load detection in a vertical direction.

If it is conceived that the seating is intended to be detected in various seating of various people, for example, it is desired that the strain generating body is easy to be deflected so as to detect the seating and the output of the strain gauge is made large even if a child sits on a front of the toilet seat, however on the other hand, there is a fear that when a grown-up shifts the weight on the toilet seat, the strain generating body is broken by a larger load applied to the strain generating body than expected.

A toilet apparatus of a first invention comprising: a casing; a toilet seat attached rotatably to the casing, an opening being provided on one of the casing or the toilet seat, a shaft portion being provided on one other of the casing or the toilet seat, the shaft portion being inserted into the opening, the shaft portion being capable of abutting the opening by movement of the toilet seat in a front-back direction; a seating detection sensor detecting seating of an user on the toilet seat, the seating detection sensor including a strain generating body and a strain gauge, the strain generating body being held on the casing or the toilet seat, the strain generating body receiving a load from the toilet seat via the shaft portion to generate a strain, the strain gauge being provided on the strain generating body and detecting a strain amount of the strain generating body; and a force release portion releasing a force applied to the opening in a horizontal direction from the shaft portion in a state of the shaft portion abutting the opening so that the force is not converted downwardly in a vertical direction.

According to the first invention, the load applied in the vertical direction to the strain generating body when the user seats on the toilet seat is not influenced by the load due to the weight shift or the like of the user, and since the original vertical load is surely applied to the strain generating body, it is possible to detect surely seating of the user on the toilet seat. Since there is no conversion from the horizontal load to the vertical load, the excessive load is not applied to the strain generating body, and it is possible to prevent the breakage of the strain generating body and the strain gauge.

According to a toilet apparatus of a second invention, the opening is provided in the casing, the shaft portion is provided in the toilet seat, and the strain generating body is held to the casing below the shaft portion.

According to the second invention, it is possible to provide the seating detection sensor on the hinge portion without changing the existing configuration largely.

According to a toilet apparatus of a third or fourth invention, the force release portion maintains a force applied from the shaft portion to the strain generating body in a vertical direction in a state of the shaft portion not abutting the opening also in a state of the shaft portion abutting the opening.

According to the third or fourth invention, it is possible to eliminate almost no noise of the vertical load applied to the strain generating body, and setting of correlation between the load applied to the strain generating body and the output of the strain gauge becomes easy.

According to a toilet apparatus of a fifth or sixth invention, the force release portion is a vertical surface of the opening, the shaft portion being capable of abutting the vertical surface.

According to the fifth or sixth invention, even if the shaft portion abuts the side face (vertical surface), the shat portion receives just only a reaction force in the horizontal direction from the opening, and does not receives the force in the vertical direction. Therefore, the force applied in the vertical direction to the strain generating body from the shaft portion in a state of the shaft portion not abutting the side face of the opening does not change also in a state of the shaft portion abutting the side face of the opening, and is maintained.

According to the invention, it is possible to improve a seating detection performance against a small load and to prevent breakage of the strain generating body and the strain gauge due to a large load while improving a quality by providing the seating detection sensor using the strain gauge at the hinge portion.

Various embodiments will be described hereinafter with reference to the accompanying drawings. The same numerals are applied to similar constituent elements in the drawings.

Figure 1A:
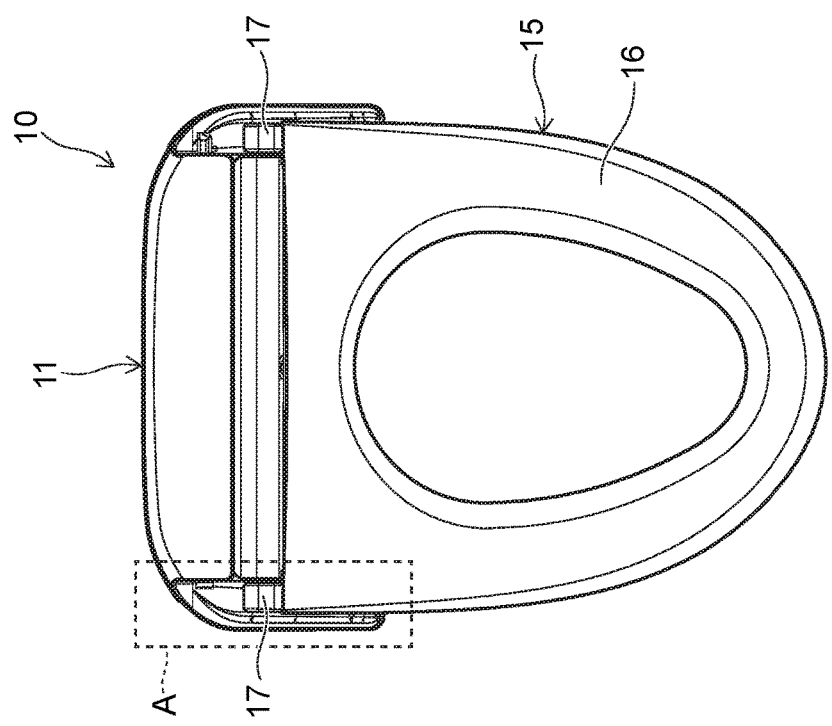
FIG. 1A is a top view of a toilet apparatus of an embodiment.

FIG. 1A is a top view of a toilet apparatus 10 of an embodiment.

The toilet apparatus 10 of the embodiment includes a casing 11 and a toilet seat 15. The toilet seat 15 includes a toilet seat main part 16, and a pair of shaft portions (rotation shaft) 17 provided near left and right ends in a width direction at a rear end portion of the toilet seat main part 16.

The shaft portion 17 of the toilet seat 15 is inserted into an opening described later and formed in the casing 11, and the toilet seat 15 is rotatably attached to the casing 11 using the shaft portion 17 as a fulcrum. In the toilet apparatus 10 of the embodiment, a portion serving as a fulcrum of rotation of the toilet seat 15 is referred to as a hinge portion as well.

FIG. 1B is an enlarged view of a portion (portion A of FIG. 1A) provided with one hinge portion in a pair of hinge portions. FIG. 1B shows state in which the toilet seat main part 16 is removed.

The one hinge portion shown in FIG. 1B is provided with a seating detection sensor as described later. The other hinge portion is not provided with the seating detection sensor. Or the seating detection sensor may be provided in the other seating detection sensor. The seating detection sensor may be provided in at least one of the two hinge portions.

Figure 2:
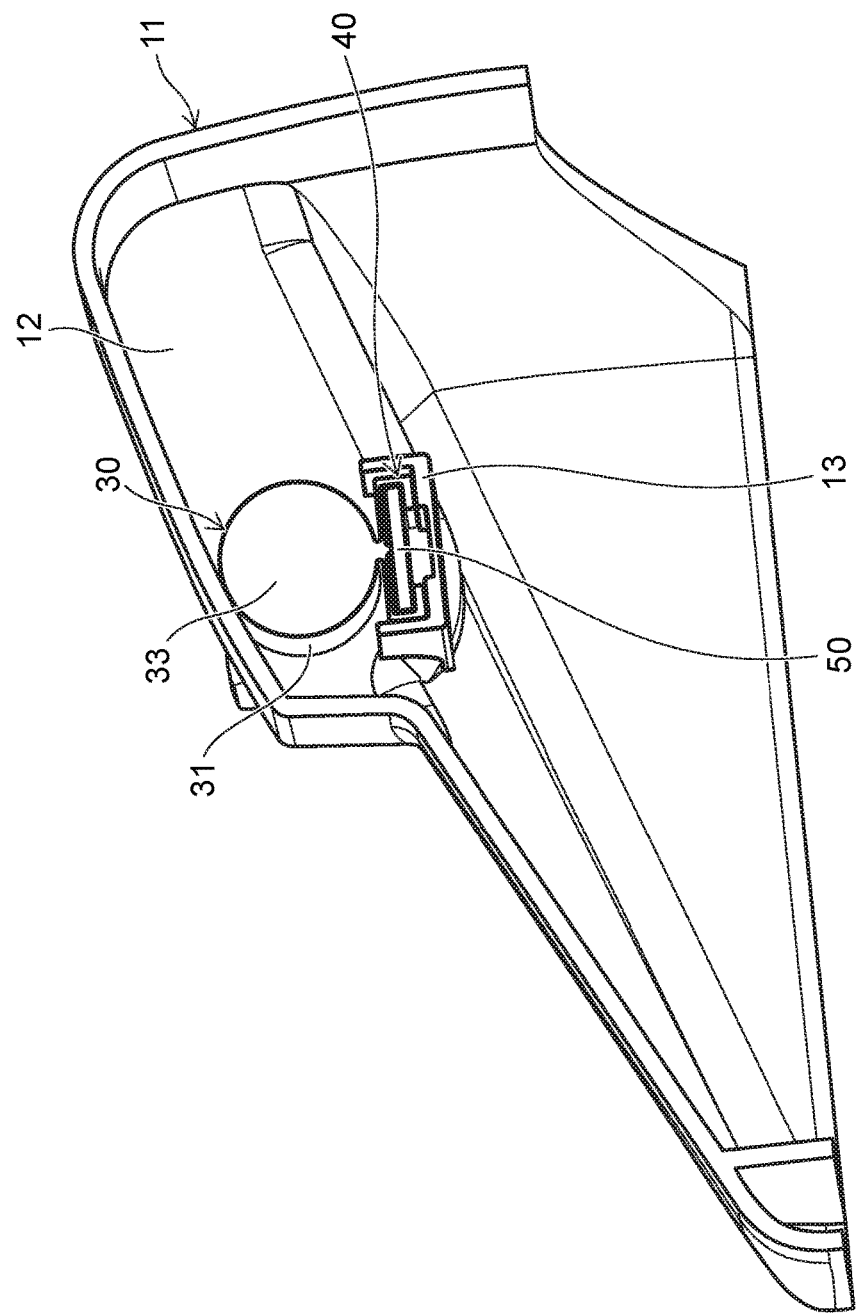
FIG. 2 is a perspective view of a portion shown in FIG. 1B as viewed from right side.

FIG. 2 is a perspective view of a portion shown in FIG. 1B as viewed from right side.

Figure 3:
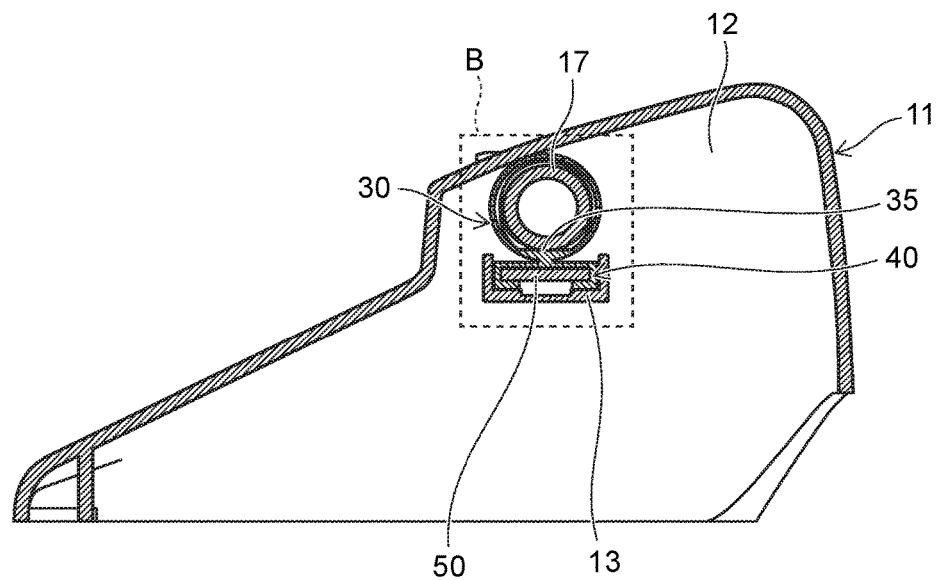
FIG. 3 is an A-A cross sectional view in FIG. 1B.

FIG. 3 is an A-A cross sectional view in FIG. 1B.

Figure 4:
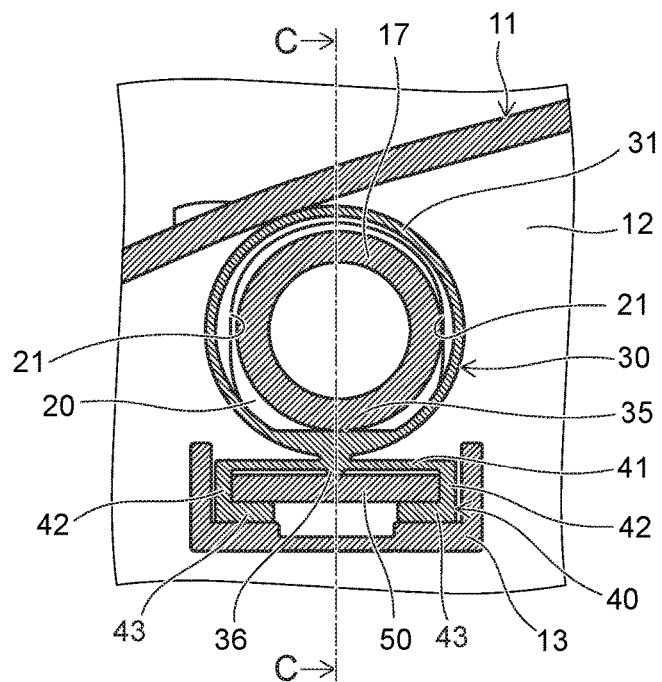
FIG. 4 is an enlarged view of a portion B in FIG. 3.

FIG. 4 is an enlarged view of a portion B in FIG. 3.

Figure 5:
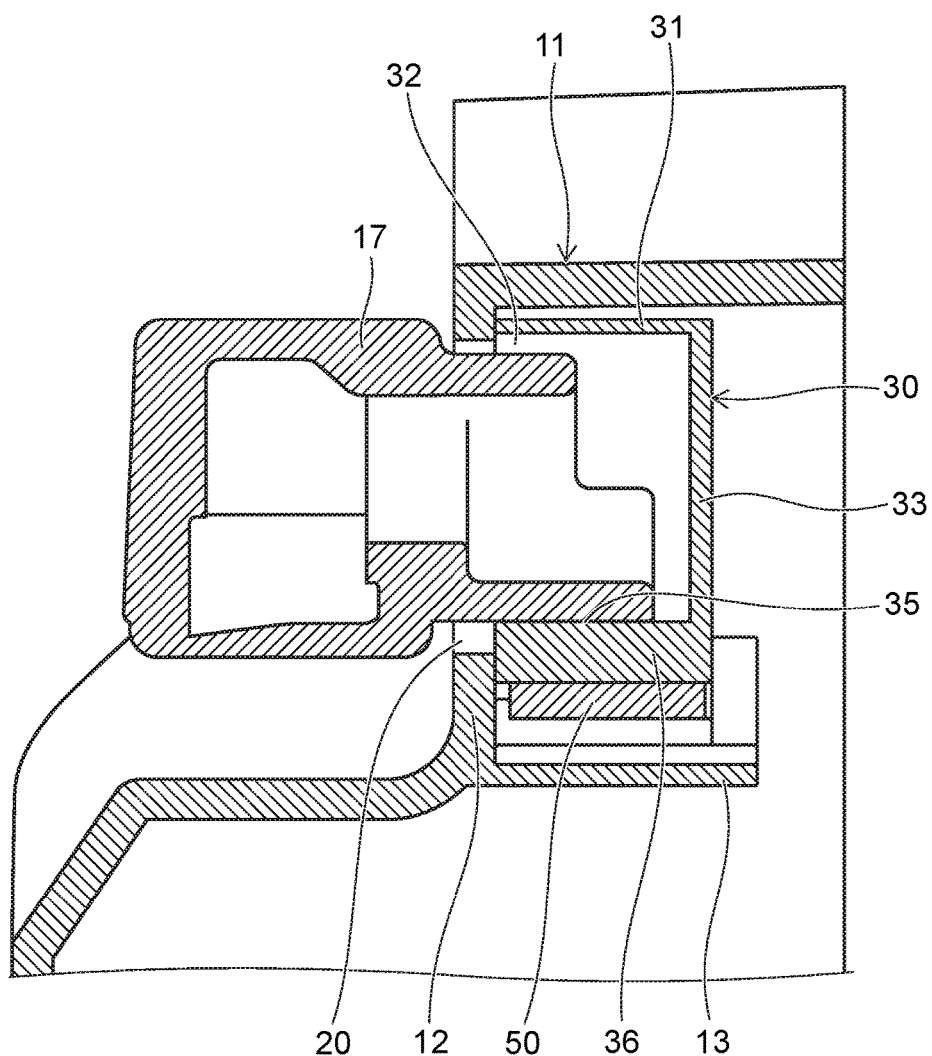
FIG. 5 is a B-B cross sectional view in FIG. 1B.

FIG. 5 is a B-B cross sectional view in FIG. 1B. FIG. 5 corresponds to a C-C cross sectional view in FIG. 4.

Figure 6A:
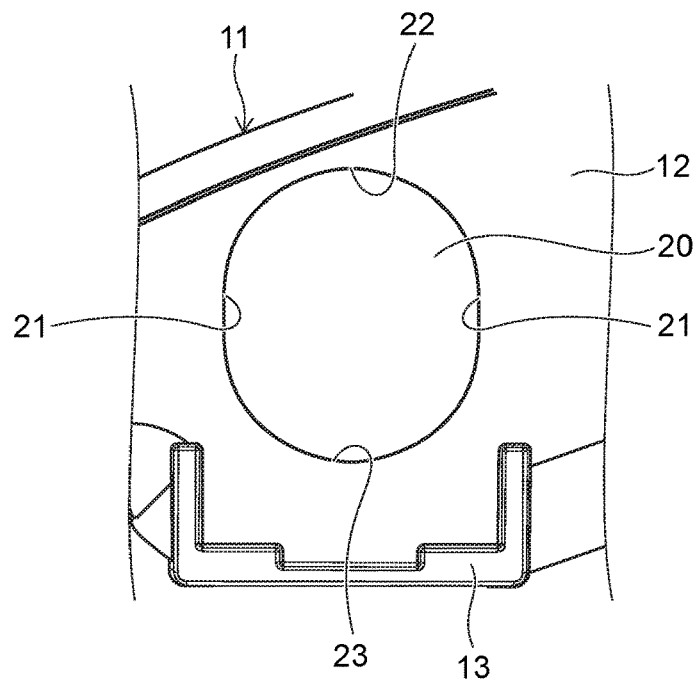
FIG. 6A is an enlarged view of an opening formation portion in a casing of the embodiment.
Figure 6B:
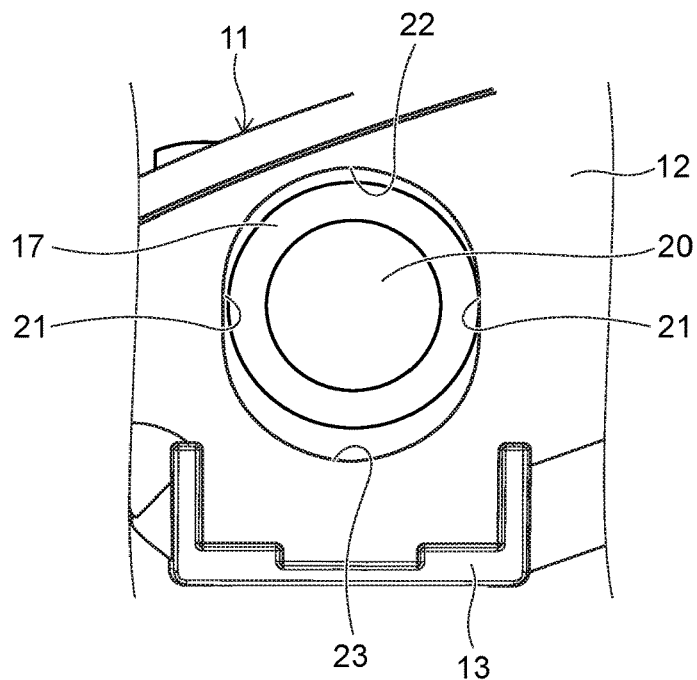
FIG. 6B shows insertion of a shaft portion of the toilet seat into the opening of FIG. 6A.

FIG. 6A is an enlarged view of an opening formation portion in the casing 11, and FIG. 6B shows insertion of shaft portion 17 of the toilet seat 15 into an opening 20 of FIG. 6A.

As shown in FIG. 6A, the opening 20 is formed on a side face 12 of the casing 11. In FIGS. 6A and 6B, the left side shows the front of the toilet apparatus 10, the right side shows the rear of the toilet apparatus 10, and the lower side shows a direction of action of gravity.

A side face 21 on the front side and a side face 21 on the rear side in the opening 20 of the toilet apparatus are a vertical surface extending in the vertical direction. A face 22 on the upper side and a face 23 on the lower side to the side face (vertical surface) 21 in the opening are curved surfaces. The side face 21, the face 22 on the upper side, and the face 23 on the lower side are continuously formed and form a contour of the opening 20.

The face 22 on the upper side is an upwardly convex curved surface, and the face 23 on the lower side is a downwardly convex curved surface. A distance along a horizontal direction between a pair of side faces 21 is shorter than a distance along the vertical direction between a top of the face 22 on the upper side and a bottom of the face 23 on the lower side.

AS shown in FIG. 4, FIG. 5, and FIG. 6B, the shaft portion 17 of the toilet seat 15 is formed cylindrically, and the shaft portion 17 is inserted inside the casing 11 through the opening 20. A clearance tolerating rotation of the shaft portion 17 is formed between an outer circumferential surface of the shaft portion 17 and an inner surface of the opening 20 (side face 21, face 22 on the upper side, and the face 23 on the lower side).

For the clearance, the toilet seat 15 is slightly movable in the front-back direction (horizontal direction in FIG. 6B) of the toilet apparatus 10. Since the shaft portion 17 abuts the side face 21 of the opening 17, the toilet seat 15 is regulated to move more in the front-back direction.

Inside the casing 11, a position shift absorption member 30 is provided in the portion where the shaft portion 17 of the toilet set 15 is inserted, as shown in FIG. 4, FIG. 5.

Figure 7A:
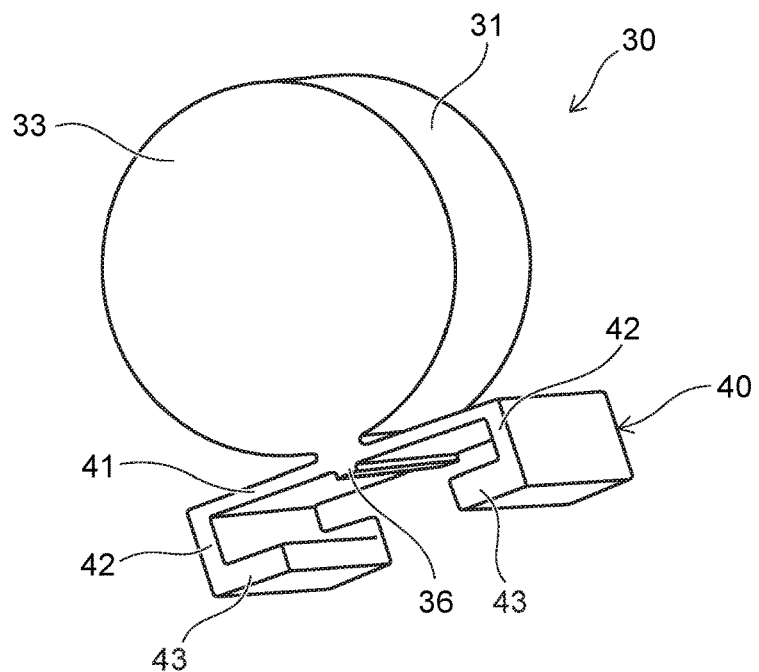
FIGS. 7A and 7B are perspective views of a position shift absorption member of the embodiment.
Figure 7B:
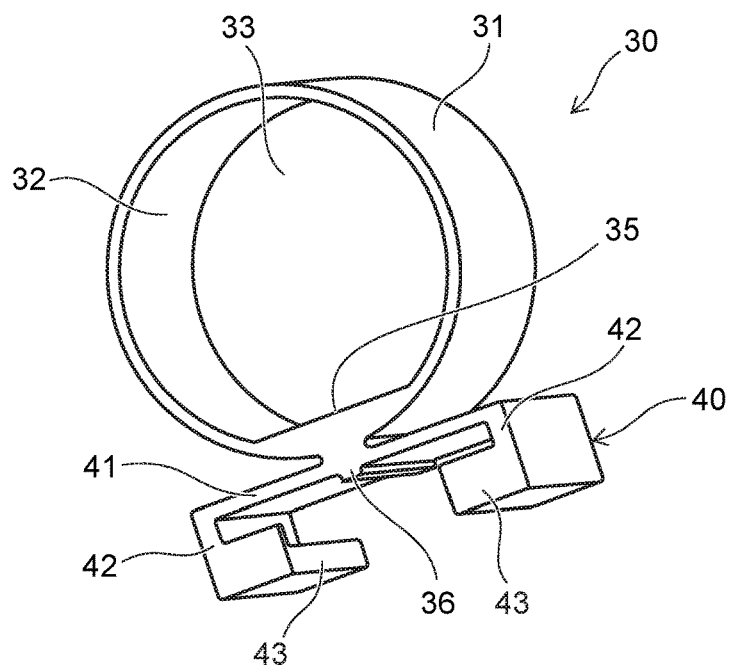

FIG. 7A is a perspective view of the position shift absorption member 30, and FIG. 7B is a perspective view of the position shift absorption member 30 as viewed from the opposite side to FIG. 7A.

The position shift absorption member 30 includes a tubular portion 31 and a push portion 36, and these are provided integrally. Furthermore, a regulation means 40 is integrally provided with the position shift absorption member 30. The regulation means 40 may be another body to the position shift absorption member 30.

A load receiver 35 is provided in a lower portion in the vertical direction of the tubular portion 31. A portion of an inner circumferential surface of the tubular portion 31 is a horizontal surface, and the horizontal surface serves as the load receiver 35. An opening 32 is formed on one side in an axis direction of the tubular portion 31, and a cover 33 is integrally provided on the other side.

The regulation means 40 is provided below the outside of the outer circumferential surface of the tubular portion 31. The regulation means 40 includes an upper face portion 41, a side face portion 42, and a lower face portion 43, and these are integrally provided in a quadrangle frame shape. The lower face portion 43 is not continuous in the horizontal direction, divided by a notch, and the side face portion 42 and the lower face portion 43 are formed in an L-shape in the cross section.

The push portion 36 is provided on a back surface of the upper face portion 41 below the load receiver 35. The push portion 36 is provided as a protrusion portion projecting downward from the back surface of the upper face portion 41, and extends in the axis direction of the tubular portion 31.

As shown in FIGS. 6A and 6B, a holding portion 13 in a recessed shape is provided below the opening 20 inside the side face 12 of the casing 11. The holding portion 13 is integrally provided with the casing 11.

As shown in FIG. 5, the position shift absorption member 30 is provided above the holding portion 13 inside the side face 12 of the casing 11. As shown in FIG. 2, FIG. 4, the regulator means 40 is disposed in the holding portion 13 in a recessed shape of the casing 11. The lower face portion 43 of the regulator means 40 is on a bottom of the holding portion 13, and the bottom of the holding portion 13 supports the regulator means 40 and the position shift absorption member 30 in the vertical direction.

The side face portion 42 of the regulator means 40 abuts the side face of the holding portion 13, and thus the movement of the regulator means 40 and the position shift absorption member 30 in the front-back direction (horizontal direction in FIG. 4) of the toilet apparatus 10 is regulated.

As shown in FIG. 5, the shaft portion 17 of the toilet seat 15 is inserted inside the tubular portion 13 through the opening 20 of the casing 11 and the opening 32 of the tubular portion 13 of the position shift absorption member 30, and the shaft portion 17 is on the load receiver 35 of the position shift absorption member 30.

In a state of the shaft portion 17 being on the load receiver 35, the clearance is ensured between the shaft portion 17 and the face 23 on the lower side of the opening 20 of the casing 11. That is, the load of the toilet seat 15 in the vertical direction is not applied to the face on the lower side of the opening 20 of the casing 11. The load receiver 35 of the position shift absorption member 30 receives the load of the toilet seat 15 in the vertical direction via the shaft portion 17.

The cover 33 is provided on an opposite side of the opening 32 in which the shaft portion 17 is inserted in the tubular portion 13 of the position shift absorption member 30 as shown in FIG. 2, FIG. 5.

As shown in FIG. 4, a strain generating body 50 is held inside the regulator means 40. The strain generating body 50 is sandwiched between the push portion 36 of the position shift absorption member 30 and the lower face portion 43 of the regulator means 40. A side face of the strain generating body 50 abuts the side face portion 42 of the regulator means 40, and the movement of the strain generating body 50 in the front-back direction (horizontal direction in FIG. 4) is regulated. That is, the relative shift in the front-back direction of the strain generating body 50 to the push portion 36 is regulated.

The regulator means 40 is supported on the holding portion 13 of the casing 11. Therefore, the strain generating body 50 held on the regulator means 40 is held to the casing 11 below the shaft portion 17 of the toilet seat 15.

The load receiver 35 is provided between the shaft portion 17 and the strain generating body 50, and the shaft portion 17 is on the load receiver 35 in contact with the load receiver 35. The push portion 36 is provided between the load receiver 35 and the strain generating body 50. The load receiver 35 receives the load of the toilet seat 15 via the shaft portion 17, the load received by the load receiver 35 is transmitted to the push portion 36, and the push portion 36 pushes the strain generating body 50.

The strain generating body 50 is pushed by the push portion 36 to be deflected, and the strain is generated in the strain generating body 50. The strain generating body 50 is made of a metal material, for example, made of a stainless material. Or, the strain generating body 50 may be formed from a resin material.

Figure 8:
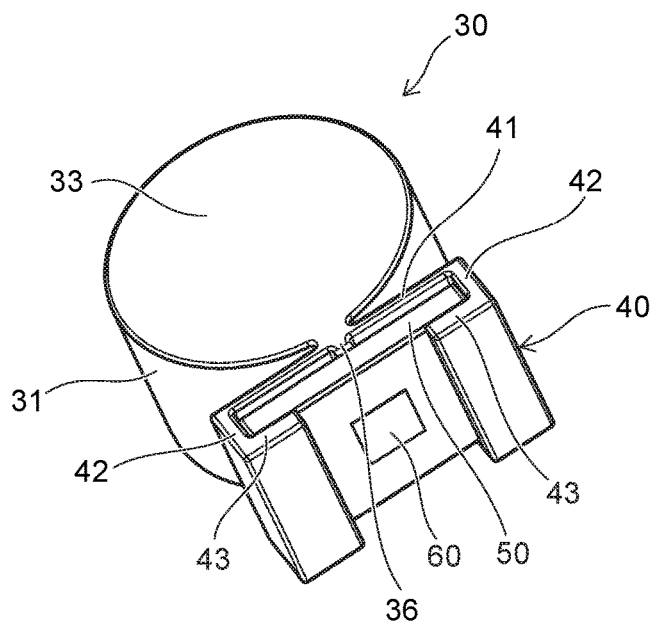
FIG. 8 is a perspective view of the position shift absorption member, a strain generating body, and a strain gauge of the embodiment.

FIG. 8 is a perspective view of the regulator means and the position shift absorption member 30 in a state of holding the strain generating body 50 as viewed from below.

As shown in FIG. 8, a stain gauge 60 detecting a strain amount of the strain generating body 50 is provided on a back surface (lower face) of the strain generating body 50. The strain gauge is formed in a region not covered with the lower face portion 43 of the regulator means 40 in the back surface of the strain generating body 50. The strain gauge 60 faces the bottom of the holding portion 13 shown in FIG. 4 via a space.

The strain generating body 50 and the strain gauge 60 form a seating detection sensor detecting seating of the user on the toilet seat 15.

Figure 9:
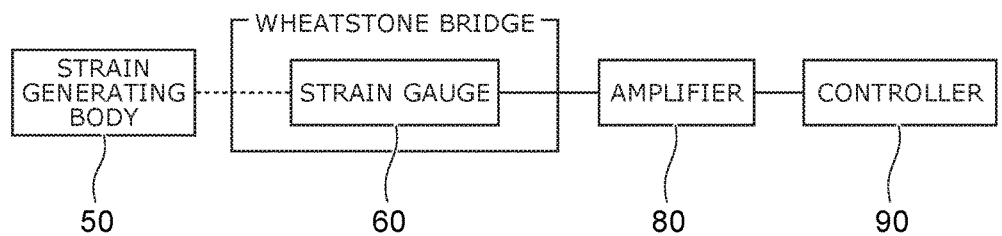
FIG. 9 is a circuit block diagram of the toilet apparatus of the embodiment.

FIG. 9 is a circuit block diagram of the toilet apparatus 10 of the embodiment.

The strain gauge 60 includes, for example, the configuration forming a Wheatstone bridge circuit from a metal film patterned on a resin film. When a force is applied to the strain generating body 50 and the strain is generated in the strain generating body 50, a resistance value of the strain gauge 60 changes and an output voltage of the Wheatstone bridge circuit changes.

The output voltage of the Wheatstone bridge circuit is inputted to a controller 90 via an amplifier 80, and the controller 90 controls various instruments of the toilet apparatus 10 in response to presence or absence of seating detection.

Figure 10C:
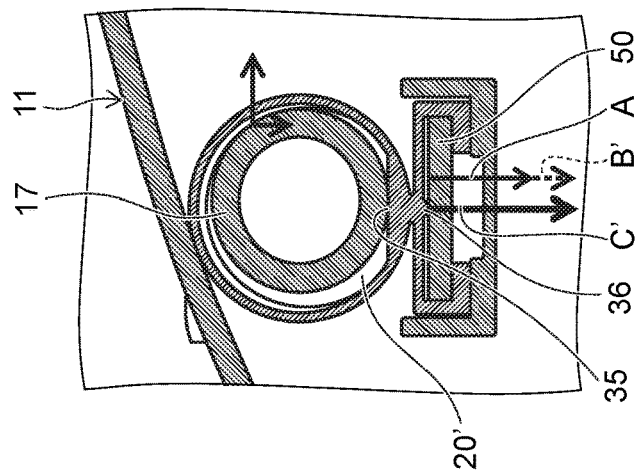
FIGS. 10B and 10C are views of comparison examples to FIG. 10A.
Figure 10B:
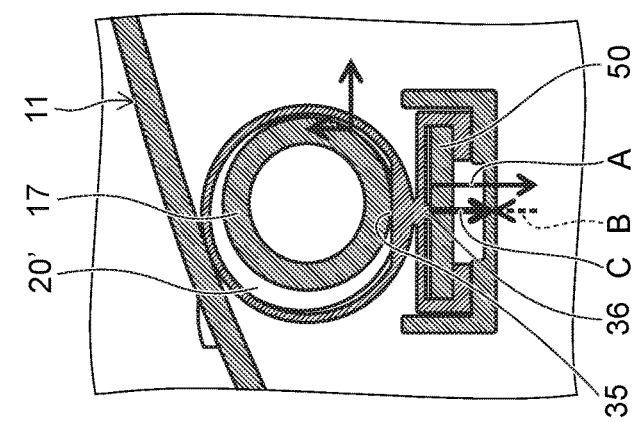
Figure 10A:
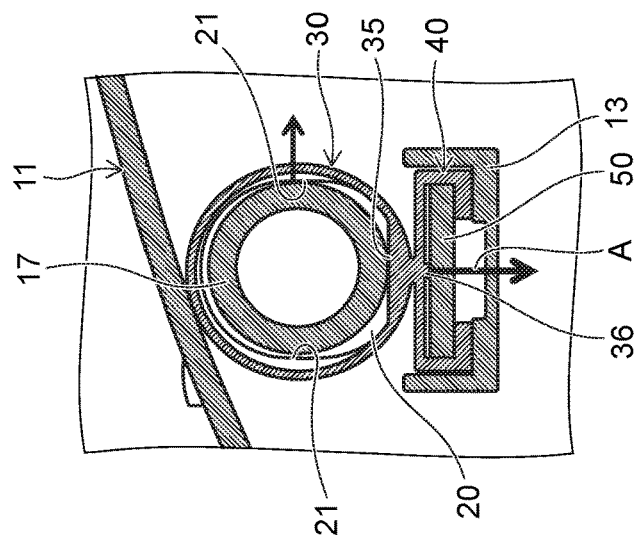
FIG. 10A is a view similar to FIG. 4 showing a hinge portion of the embodiment.

FIG. 10A is a view similar to FIG. 4 showing a hinge portion of the embodiment, and FIG. 10B and FIG. 10C are views of comparison examples to FIG. 10A.

The side face 21 of the opening 20 of the embodiment shown in FIG. 10A is a vertical surface as described before. In contrast, an opening 20' in FIGS. 10B and 10C of the comparison example has a perfect circular shape, and the side face is a curve surface.

Figure 11A:
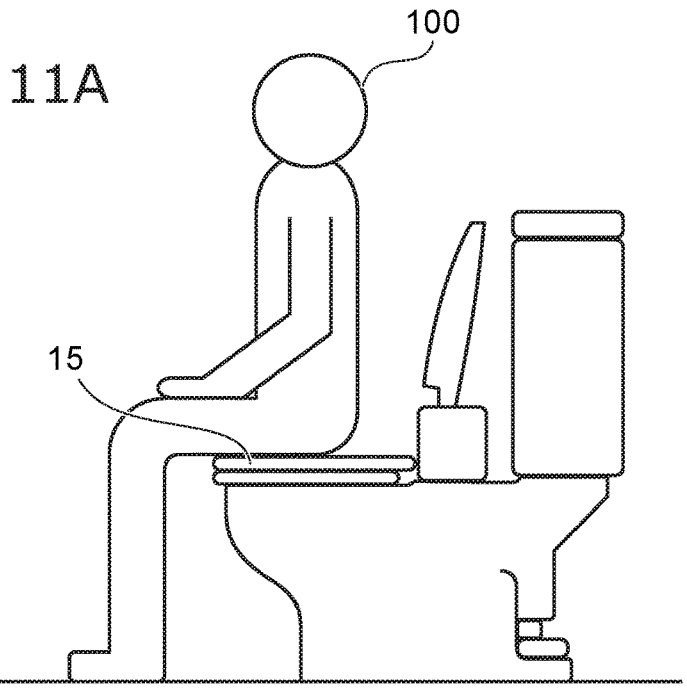
FIGS. 11A and 11B are schematic views showing movement in a front-back direction of a user seating on the toilet seat.
Figure 11B:
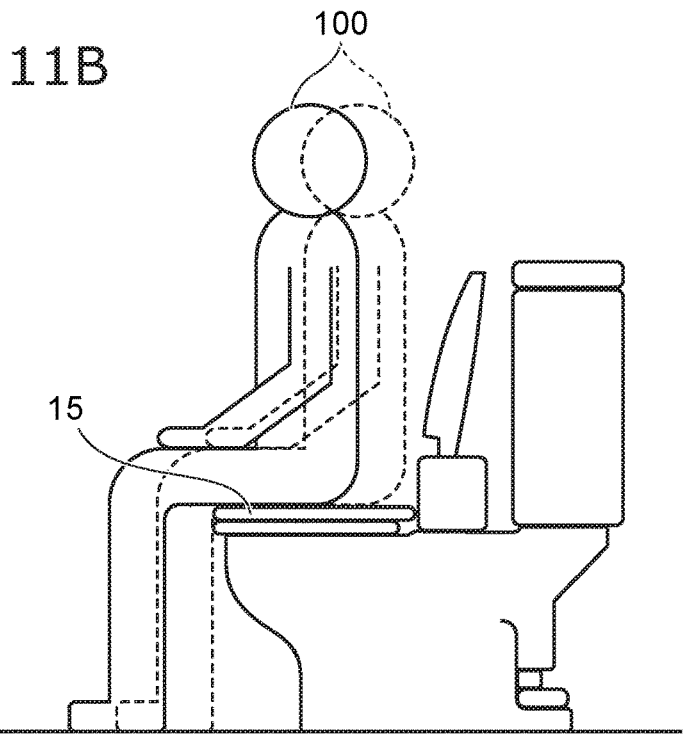

FIG. 11A shows a state in which a user 100 sits on the front of the toilet seat 15. FIG. 11B shows a state in which the user 100 shown in FIG. 11A shifts the weight to the rear side, and changes a sitting position to the rear side of the toilet seat 15.

The weight shift like this to the rear side of the user 100 also moves the shaft portion 17 of the toilet seat 15 to the rear side, the shaft portion 17 being inserted to the openings 20, 20' of the casing 11. FIG. 10A shows a state in which the shaft portion 17 abuts the side face 21 on the rear side in the opening 20 due to the movement of the shaft portion 17 to the rear side, and FIG. 10B and FIG. 10C show a state in which the shaft portion 17 abuts the inner circumferential surface on the rear side in the opening 20' due to the movement of the shaft portion 17 to the rear side.

As shown in FIGS. 10B and 10C, if the shaft portion 17 abuts the curved surface, a partial component of a horizontal load accompanied with the movement of the shaft portion 17 to the rear side is converted to a vertical load.

FIG. 10B shows an example in which the shaft portion 17 abuts a portion on the lower side of a rear side inner circumferential surface in the opening 20', and the partial component of the horizontal load is converted to a vertically upward load. An upward force is applied to the shaft portion 17 as a reaction from the opening 20'. For this reason, an original vertically downward load A applied from the shaft portion 17 to the strain generating body 50 via the load receiver 35 and the push portion 36 is reduce by an upward load B (noise of vertical load) converted from the horizontal load, and then a load C smaller than the original vertically downward load A becomes a detected load. That is, the strain amount of the strain generating body 50 decreases. This may lead an incorrect detection result (decrease of detection ability) indicating that despite the user is seated on the toilet seat 15, the user does not seat from the reason that the output voltage of the strain gauge 50 does not reach a seating detection voltage.

Conversely, FIG. 10C shows an example in which the shaft portion 17 abuts a portion on the upper side of a rear side inner circumferential surface in the opening 20', and a partial component of the horizontal load is converted to a vertically downward load. A downward force is applied to the shaft portion 17 as a reaction from the opening 20'. For this reason, a downward load B' (noise of vertical load) further converted from the horizontal load is added to the original vertically downward load A applied from the shaft portion 17 to the strain generating body 50 via the load receiver 35 and the push portion 36. This may lead breakage of the strain generating body 50 and the strain gauge 60 due to application of an excessive load C' exceeding a breakdown load (breakdown limit) of the strain generating body 50 to the strain generating body 50.

Also in the case where the toilet seat 15 moves to the front side and the shaft portion 17 abuts a front side inner circumferential surface of the opening 20', increase and decrease of the load to the original vertical load may be caused by the horizontal load.

In contrast, according to the embodiment, when the shaft portion 17 abuts the opening 20 due to the movement of the toilet seat 15 in the front-back direction, a force release portion is provided, which releases a force (horizontal load) applied to the opening 20 from the shaft portion 17 so that the force is not converted in the vertical direction. This force release portion is specifically the side face 21 of the opening 20 formed as the vertical surface.

The side face 21 in a region (range) which the shaft portion 17 in the opening 20 is capable of abutting forms the vertical surface. For that reason, even if the shaft portion 17 abuts the side face (vertical surface) 21, the shat portion 17 receives just only a reaction force in the horizontal direction from the opening 20, and does not receives the force in the vertical direction. Therefore, the force applied in the vertical direction to the strain generating body 50 from the shaft portion 17 in a state of the shaft portion 17 not abutting the side face 21 of the opening 20 does not change also in a state of the shaft portion 17 abutting the side face 21 of the opening 20, and is maintained.

That is, the load A applied downwardly in the vertical direction to the strain generating body 50 when the user seats on the toilet seat 15 is not influenced by the load due to the weight shift or the like of the user, and since the original vertical load A is surely applied to the strain generating body 50, it is possible to detect surely seating of the user on the toilet seat 15. Since there is no conversion from the horizontal load to the vertical load, the excessive load is not applied to the strain generating body 50, and it is possible to prevent the breakage of the strain generating body 50 and the strain gauge 60.

According to the embodiment configured like this, because the seating detection sensor is provided on the hinge portion that the strain amount of the strain generating body 50 is apt to be small, while the strain generating body 50 is easy to be deflected so that even though the seating of a small load can be detected, even though the horizontal load is generated by the weight shift or the like of the user, the load is not transmitted to the strain generating body 50, therefore it is possible to prevent the breakage of the strain generating body 50 and the strain gauge 60.

That is, according to the embodiment, the side face 21 of the opening 20 is simply configured to be the vertical surface, thereby the improvement of the seating detection ability to the small load is compatible with the breakage prevention of the strain generating body 50 and the strain gauge 60 due to the excessive load.

Without providing the position shift absorption member 30, the shaft portion 17 may be configured to push directly the strain generating body 50. However, like the embodiment, if the load of the shaft portion 17 is set to receive by the position shift absorption member 30 once, the position shift absorption member 30 can absorbs the position shift of the toilet seat 15.

Since an area of the load receiver 35 of the position shift absorption member 30 is broader than an area of the shaft portion 17 contacting the load receiver 35, even though the position of the shaft portion 17 shifts by movement of the user during seating, the load receiver 35 can receive surely the load due to seating of the user. Furthermore, an area of the push portion 36 pushing the strain generating portion 50 is smaller than the area of the load receiver 35, even though the shaft portion 17 shifts, the shift of the position due to the strain generating body 50 pushed by the push portion 36 is suppressed, and the position shift of the shaft portion 17 does not influence the deflection of the strain generating body 50.

That is, even if the position where the shaft portion 17 contacts the load receiver 35 varies, the load in the vertical direction is transmitted to a specified region of the strain generating body 50 from the push portion 36 independently on the contact position of the shaft portion 17. The deflection (strain amount) of the strain generating body 50 is not influenced by the position of the shaft portion 17, but depends on the magnitude of the load in the vertical direction.

In the case where without providing the position shift absorption member 30, the shaft portion 17 is configured to push directly the strain generating body 50, for example, there is a possibility that if the contact position of the shaft portion 17 shifts toward the end from the center portion of the strain generating body 50, the strain generating body 50 cannot deflect sufficiently and the strain amount necessary for detection may not be detected.

In contrast, if the position shift absorption member 30 is provided, also in the case where the shaft portion 17 is located on the center portion of the strain generating body 50 and in the case where the shaft portion 17 is located toward the end of the strain generating body 50, the push portion 36 pushes the same specified region of the strain generating body 50, the strain generating body 50 deflects in a similar way, and the strain amount detected by the strain gauge 60 becomes the same as well. Even if the user moves during seating and the shaft portion 17 shifts toward the end of the strain generating body 50, the deflection (strain) necessary for seating detection can be generated in the strain generating body 50, and it is possible to detect surely seating of the user on the toilet seat 15.

Figure 12A:
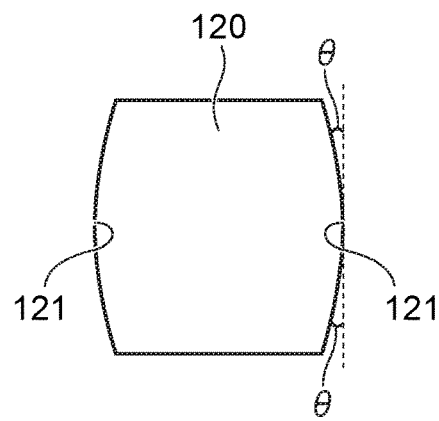
FIGS. 12A to 12C are schematic views showing other examples of the opening formed in the casing of the embodiment.
Figure 12B:
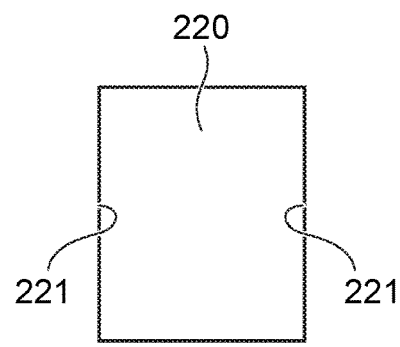
Figure 12C:
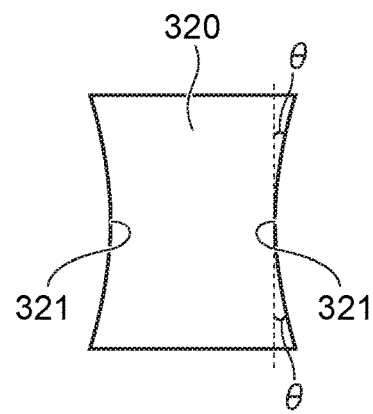

FIGS. 12A to 12C are schematic views showing other examples of the opening formed in the casing 11 and having the shaft portion 17 of the toilet seat 15 inserted.

A side face 121 of an opening 120 shown in FIG. 12A is not a vertical surface but a curved surface. A curvature of the side face 121 is smaller than a curvature of a surface on an upper side and a curvature of a surface on a lower side of the opening 120. Even if the side face 121 where the shaft portion 17 is capable of abutting is a curved surface, if the curvature is small, the magnitude of the force converted in the vertical direction when the shaft portion 17 abuts the side face 121 can be small. Even if the side face of the opening is not a perfect vertical surface and has a slight curvature, it is sufficient as long as an increase/decrease width to the original vertical load applied to the strain generating body 50 can be suppressed within a range that does not influence the seating detection and the breakdown load of the strain generating body 50.

From such a standpoint, an inclination angle θ of the side face 121 from the vertical direction is preferable to be not more than 10°, further preferable to be not more than 5°. The θ represents the inclination angle from the vertical direction (dotted line) of a line approximated by a straight line of the side face 121 indicated as a curved surface in a plan view of the opening 120 or a tangential line at an arbitrary point.

It is sufficient that a shape (contour) of the opening is rotatable in as state in which the shaft portion 17 is inserted into the opening. For example, as shown in FIG. 12B, it may be a rectangular opening 220. The opening 220 has a side face 221 which is a vertical surface as well as the opening 20 of the above embodiment, furthermore a surface on an upper side and a surface on a lower side are continuous planar surfaces forming a right angle to a side face 221.

Like an opening 320 shown in FIG. 12C, a side face 321 may be a curved surface becoming a mountain toward the inside the opening 320. Also in this case, as described previously, the inclination angle θ from the vertical direction of the side face 321 is preferable to be not more than 10°, furthermore preferable to be not more than 5°.

Figure 13B:
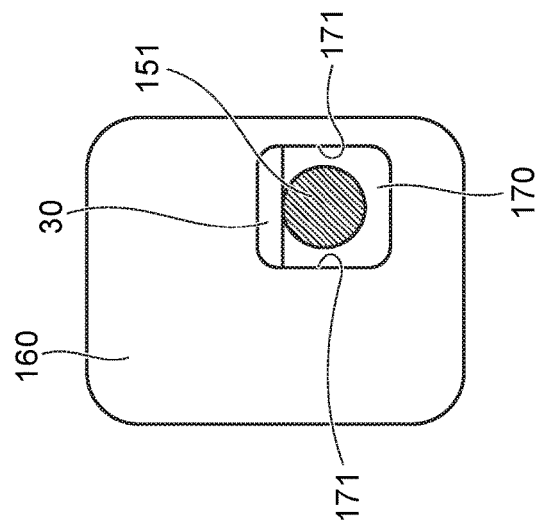
FIG. 13B is a partial cross sectional side view as viewing a left side to a D-D line in FIG. 13A.
Figure 13A:
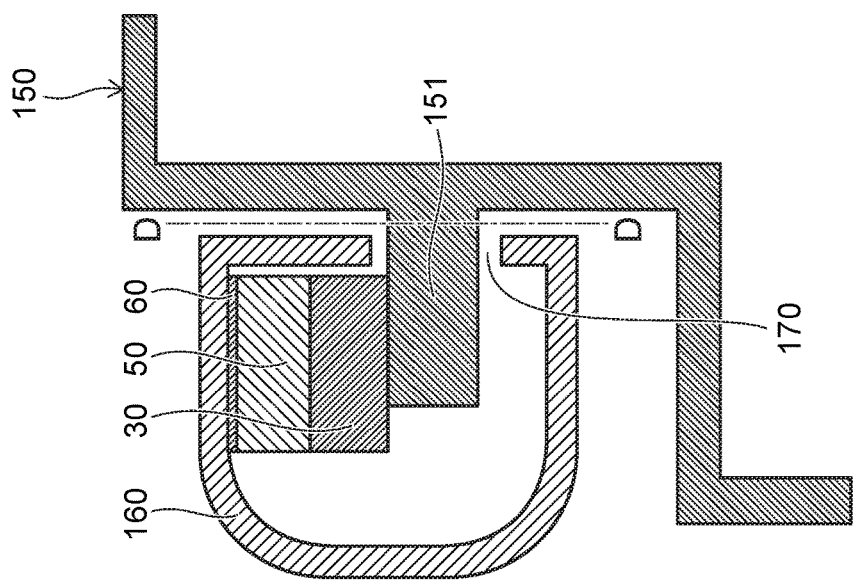
FIG. 13A is a schematic cross sectional view along a vertical direction of a hinge portion of other embodiment.

FIG. 13A is a schematic cross sectional view along a vertical direction of a hinge portion of other embodiment, and FIG. 13B is a partial cross sectional side view as viewing a left side to a D-D line in FIG. 13A.

In the hinge portion as shown in FIGS. 13A and 13B, a shaft portion 151 is provided in a casing 150, and an opening 170 into which the shaft portion 151 is inserted is formed on the toilet seat 15 side.

The toilet seat 15 includes the toilet seat main part 16 shown in FIG. 1A and a hollow shaft portion 160 shown in FIG. 13A, and the toilet seat main part 16 is combined with the hollow shaft portion 160. The opening 170 is formed in the hollow shaft portion 160, and the shaft portion 151 of the casing 150 is inserted into the opening 170.

The hollow shaft portion 160 is rotatable around the shaft portion 151, and consequently the toilet seat 15 rotates using the shaft portion 151 of the casing 150 as a fulcrum.

The strain generating body 50 is held on an inner wall of the hollow shaft portion 160 on the toilet seat side. The strain gauge 60 is provided on the upper surface of the strain generating body 50. The strain generating body 50 is provided above the shaft portion of the casing 150, and the position shift absorption member 30 is provided between the strain generating body 50 and the shaft portion 151.

The hollow shaft portion 160 of the toilet seat 15 holding the strain generating body 50 is on the shaft portion 151 of the casing 150 via the position shift absorption member 30. That is, the shaft portion 151 of the casing 150 receives the vertically downward load of the toilet seat 15 via the position shift absorption member 30, and generates the strain in the strain generating body 50. The strain amount of the strain generating body 50 is detected by the strain gauge 60.

Due to the movement of the toilet seat 15 in the front-back direction (horizontal direction in FIG. 13B), the hollow shaft portion 160 of the toilet seat 15 moves in the front-back direction, and the shaft portion 151 of the casing 150 is capable of abutting a side face 171 of the opening 170.

As shown in FIG. 13B, the side face 171 of the opening 170 is a vertical surface. For that reason, as described previously, even if the shaft portion 151 abuts the side face (vertical surface) 171 of the opening 170, the load in the horizontal direction is not converted to the load in the vertical direction. Therefore, since the load applied to the strain generating body 50 in the vertical direction when the user seats on the toilet seat 15 is not influenced by the load due to the weight shift or the like of the user in the front-back direction, and the original vertical load is applied surely to the strain generating body 50, it is possible to detect surely seating of the user on the toilet seat 15. Since the vertical load converted to the horizontal load is not transmitted to the strain generating body 50, the excessive load is not applied to the strain generating body 50 and it is possible to prevent the breakage of the strain generating body 50 and the strain gauge 60.

The embodiments of the invention have been described with reference to the specific example. However, the invention is not limited thereto. Various variations are possible on the basis of the technical idea of the invention.

What is claimed is:

1. A toilet apparatus comprising:
a casing;
a toilet seat attached rotatably to the casing, an opening being provided on one of the casing or the toilet seat, a shaft portion being provided on one other of the casing or the toilet seat, the shaft portion being inserted into the opening, the shaft portion being capable of abutting the opening by movement of the toilet seat in a front-back direction;
a seating detection sensor detecting seating of an user on the toilet seat, the seating detection sensor including a strain generating body and a strain gauge, the strain generating body being held on the casing or the toilet seat, the strain generating body receiving a load from the toilet seat via the shaft portion to generate a strain, the strain gauge being provided on the strain generating body and detecting a strain amount of the strain generating body; and
a force release portion releasing a force applied to the opening in a horizontal direction from the shaft portion in a state of the shaft portion abutting the opening so that the force is not converted downwardly in a vertical direction.

2. The toilet apparatus according to claim 1, wherein
the opening is provided in the casing,
the shaft portion is provided in the toilet seat, and
the strain generating body is held to the casing below the shaft portion.

3. The toilet apparatus according to claim 2, wherein
the force release portion maintains a force applied from the shaft portion to the strain generating body in a vertical direction in a state of the shaft portion not abutting the opening also in a state of the shaft portion abutting the opening.

4. The toilet apparatus according to claim 3, wherein
the force release portion is a vertical surface of the opening, the shaft portion being capable of abutting the vertical surface.

5. The toilet apparatus according to claim 1, wherein
the force release portion maintains a force applied from the shaft portion to the strain generating body in a vertical direction in a state of the shaft portion not abutting the opening also in a state of the shaft portion abutting the opening.

6. The toilet apparatus according to claim 5, wherein
the force release portion is a vertical surface of the opening, the shaft portion being capable of abutting the vertical surface.

* * * * *